US006625544B1

(12) United States Patent
Laurent et al.

(10) Patent No.: US 6,625,544 B1
(45) Date of Patent: Sep. 23, 2003

(54) METHOD OF CONTROLLING THE QUALITY OF SEISMIC DATA MIGRATION BY USING THE GENERALIZED RADON TRANSFORM DESCRIPTION

(75) Inventors: Christophe Laurent, Gentilly (FR); Di Cao, Yokohama (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/507,878

(22) Filed: Feb. 22, 2000

(30) Foreign Application Priority Data

Mar. 23, 1999 (FR) .............................. 99 03590

(51) Int. Cl.[7] .............................................. G06F 19/00
(52) U.S. Cl. .............................................. 702/17; 703/5
(58) Field of Search ................................ 702/17, 13, 6; 703/14, 10, 5; 367/83, 31

(56) References Cited

U.S. PATENT DOCUMENTS

| 4,760,563 | A | | 7/1988 | Bevlkin |
| 5,583,825 | A | * | 12/1996 | Carrazzone et al. .......... 367/31 |
| 5,677,893 | A | | 10/1997 | Hoop et al. |
| 5,909,655 | A | | 6/1999 | Canadas et al. |
| 6,374,185 | B1 | * | 4/2002 | Taner et al. .................. 702/6 |
| 6,446,007 | B1 | * | 9/2002 | Finn et al. .................... 702/14 |

FOREIGN PATENT DOCUMENTS

EP    0 515 189    7/1996

OTHER PUBLICATIONS

M. Oristaglio, G. Beylkin and D. Miller, "The Generalized Radon Transform, a Breakthrough in Seismic Migration," *The Technical Review*, v. 35, No. 3, pp. 20–27 (1987).

S. Geoltrain and E. Chovet, "Automatic Association of Kenematic Information to Pre–Stack Images," *61st Annual International Meeting Sot. Expl. Geophys.*, Expanded Abstracts pp. 890–892 (1991).

* cited by examiner

*Primary Examiner*—John Barlow
*Assistant Examiner*—Victor J. Taylor
(74) *Attorney, Agent, or Firm*—Robin Nava; Brigitte Jeffery; John Ryberg

(57) ABSTRACT

The present invention relates to a method of controlling the quality of seismic data that has been migrated using the generalized Radon transform, the method serving to pass between a seismic data space and a migrated image space, in which method a parameter table is calculated giving, for a seismic wave going from a point of the image to a source or a sensor, its path length, its travel time, and the angles of incidence of the wave at the beginning and at the end of the path, and in which correspondence is established between at least one zone of a first one of said two spaces and at least one zone of the second space, by using said parameter table to fill in a correspondence table QCimage.

20 Claims, 9 Drawing Sheets

F I G. 14
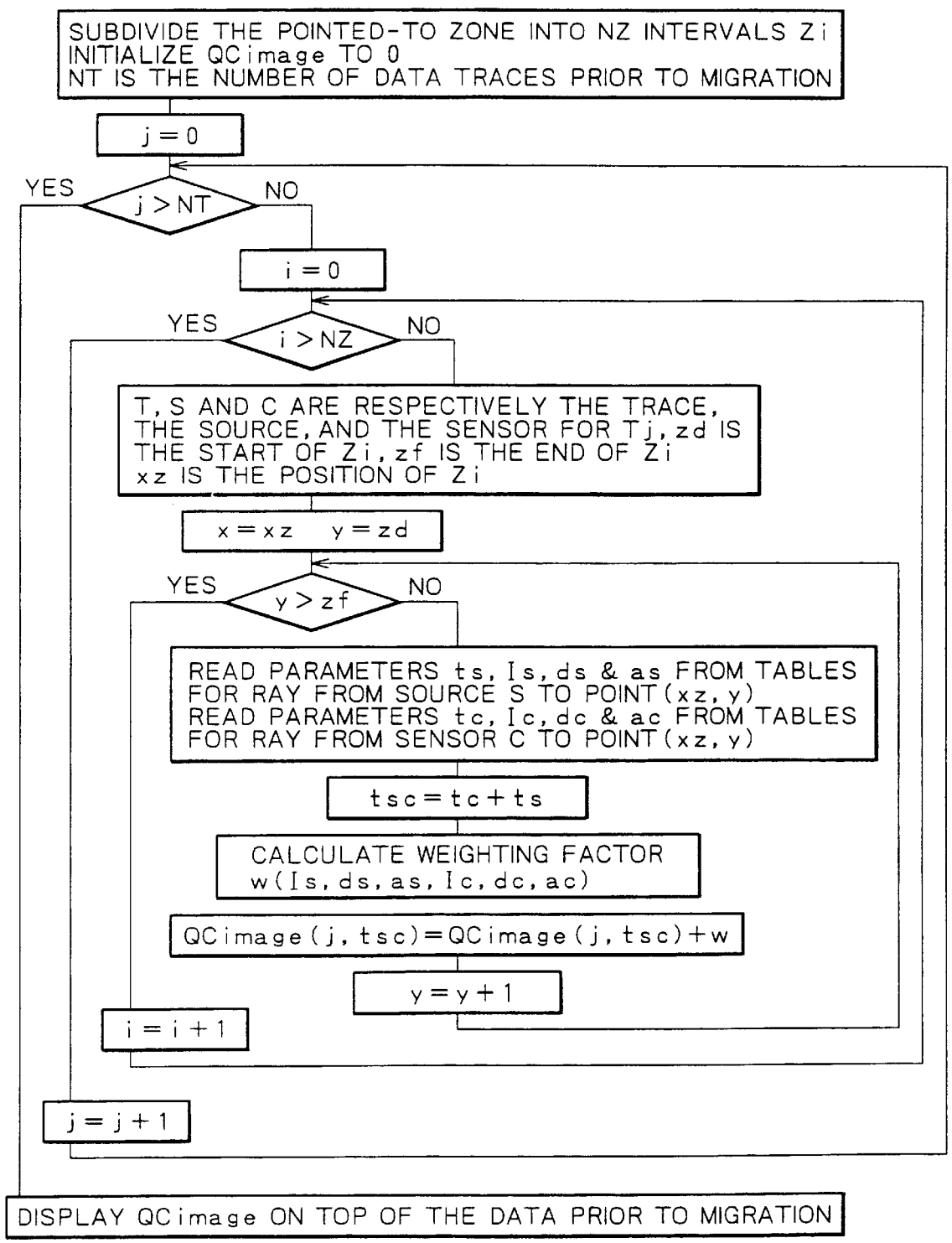

METHOD OF CONTROLLING THE QUALITY OF SEISMIC DATA MIGRATION BY USING THE GENERALIZED RADON TRANSFORM DESCRIPTION

FIELD OF THE INVENTION

The present invention relates to a method of controlling the quality of seismic data migration by using the generalized Radon transform (GRT).

BACKGROUND OF THE INVENTION

There exist numerous techniques that are used by geophysicists to find out about the geological layers constituting the subsoil. One of these techniques, known as a "well seismic surveying" is shown in FIG. 1 and consists in emitting sound signals at the surface of the ground (source S) and in using sensors Ci located in a well 10 to record the seismic waves as they are transmitted after reflection and/or refraction on the boundaries between the various geological layers. After the waves have been recorded by the sensors, they are filtered to determine which waves were reflected by reflectors situated beneath the sensors. FIG. 2A shows the signals as recorded prior to filtering and FIG. 2B shows the corresponding signals after filtering. A migration method applied to the filtered signals then makes it possible to obtain a migrated image which can be thought of as a vertical section plane through the subsoil containing the source(s) and the sensors in the well. As shown in FIG. 3. the migrated image is constituted by a succession of vertical recordings referred to as "migrated seismic traces" constituted by signals of greater or lesser amplitude made up of positive and negative arches. The signals relating to the same reflector correlate from one trace to the next, so that the eye can see delineations which correspond to boundaries between geological layers.

The document "The generalized Radon transform, a breakthrough in seismic migration", by M. Oristaglio, G Beylkin. and D. Miller (Seismics, The Technical Review. Volume 35, Number 3, 1987. pages 20 to 27) describes an example of the migration method which makes use of the generalized Radon transform (GRT). The GRT migration method constructs the migrated image point-by-point. As shown in FIG. 4, each image point I1 or I2 is considered as a point of velocity change in the medium that is capable of reflecting energy coming from the source S. The energy diffused by said point propagates in all directions and is finally detected by the sensors. The travel time of the seismic wave is calculated by dividing the sum of the distance ls from the source to said point plus the distance lc from the point to the sensor by the assumed propagation speed of the wave in the subsoil. This propagation speed is referred to as the velocity of the medium.

For each particular reflector point in the space of the migrated image it is possible to obtain a travel time curve in the data space: CI1, CI2; by calculating the seismic wave arrival times at each sensor as shown in FIG. 5.

Inversely, each point P in the data space corresponds to the amplitude of the signal measured by a sensor at a given instant, which measured signal is due to a plurality of waves reflected by different reflector points all reaching the sensor at the same time. Thus, every point of the migrated image whose travel time curve passes through a given point P contributes to the amplitude of the signal at that point. The set of these reflecting points constitutes an isochronous curve which. as shown in FIG. 4, is elliptical in shape, with the source S and the sensor C being at the foci, assuming that the velocity in the subsoil is constant.

In application of the generalized Radon transform, each point of the migrated image is obtained by summing the contributions of data along the corresponding travel time curve, said contributions being weighted to take account of physical phenomena relating to wave propagation, for example loss of amplitude proportional to path length. To calculate path curves by ray tracing, an initial speed model is used which integrates a priori knowledge about the subsoil, such as the model shown in FIG. 6.

The GRT migration algorithm thus has the following steps:

For each data trace T, for each point (x, z) of the migrated image:
   i) the travel time ts from the soure S to the point (x, z) is calculated;
   ii) the travel time tc from the sensor C to the point (x, z) is calculated;
   iii) this gives the source-to-sensor travel time: tsc=ts+tc;
   iv) the sample u of the trace T at time tsc is found;
   v) the-weighting factor w relating to the source S, to the sensor C, and the point (x, z) is found;
   vi) the value of an image table (x, z) at said point is calculated;

$$\text{Image}(x, z) = \text{Image}(x, z) + u \times w.$$

A variant of this GRT algorithm consists in a first step in calculating the table of travel time parameters t, the path length l, and the direction of the ray at its ends d and a, and in a second step in performing the migration calculation. Thus, as shown in FIG. 7, for each source and for each sensor C, the travel times $t(P, I_{xy})$ to go from said source or said sensor to all of the migrated image points $I_{xy}$ are calculated. The path lengths $l(P, I_{xy})$ and the orientations of the ray at its ends $a(P, I_{xy})$ and $d(P, I_{xy})$ are calculated. In the second step. migration uses the table calculated during the first step.

For example, with filtered seismic signals as shown in FIG. 8, GRT migration enables a migrated image to be obtained of the kind shown in FIG. 9.

Before using the results as shown in FIG. 9, the operator must verify that they are well-founded. It is necessary to perform quality control thereon. Traditionally. this has been based on more or less subjective criteria such as how the results correspond with a priori knowledge about the subsoil, or the continuity of the delineations representing the reflectors. It is thus very difficult to perform such quality control. particularly since the representation of the data before migration (FIG. 8) is very different from the representation of the data in the migrated image (FIG. 9).

A method described in "Automatic association of kinematic information to pre-stack images", by S. Geoltrain and E. Chovet (61st Annual International Meeting, Sot. Expl. Geophys., Expanded Abstracts, 1991, pages 890 to 892), for Kirchhoff migration. makes it possible to associate each point of the migrated image with a point in data space. Nevertheless, that method does not enable each point in the migrated image to be associated with all of the contributing points along the travel time curve. Nor does it make it possible to find the isochronous curve associated with a point in data space.

An object of the present invention is to solve those problems by proposing a quality control method for GRT migration of seismic data by interactive identification of events between the image obtained by migration and the seismic data prior to migration.

SUMMARY OF THE INVENTION

The present invention provides a method of controlling the quality of seismic data that has been migrated using the generalized Radon transform, the method serving to pass between a seismic data space and a migrated image space, in which method a parameter table is calculated giving, for a seismic wave going between a point of the image and a source or a sensor, its path length, its travel time, and the angles of incidence of the wave at the beginning and at the end of the path, the method being characterized in that correspondence is established between at least one zone of a first one of said two spaces and at least one zone of the second space by using said parameter table to fill in a correspondence table QCimage.

The parameter table is usually obtained by ray tracing, but it can also obtained by any other means making it possible to determine, for a seismic wave going between an image point and a source or a sensor, its path length, its travel time, and the angles of incidence of the wave at the beginning and end of the path.

The method of the invention makes it possible firstly to point to a zone in seismic data space and to project it into migrated image space by local migration relating to the pointed-to zone ("forward projection"). The method also makes it possible to point to a zone in migrated image space and to project it into seismic data space by calculating the seismic data field that contributes to the zone pointed to in the migrated image ("backward projection").

In the first embodiment (forward projection) the point (x, z) of the migrated image is put into correspondence with the corresponding zone in data space if the value QCimage(x, z) of the correspondence table is greater than a given threshold, e.g. zero.

Advantageously, the zone pointed to in data space is a set of intervals Zi each characterized by a trace T. and the start and finish td and tf of the corresponding interval. For each interval Zi and for each point (x, z) of the migrated image, the following steps are performed:

i) for the ray to the sensor C relating to said interval Zi at the point (x, z). the following parameters are read from the parameter table: travel time tc, path length lc, and orientation of the ray at its ends dc and ac;

ii) the source-to-sensor travel time tsc tc+ts is calculated;

iii) if td≦tsc≦tf, then the following weighting factor w(ls, ds, as, lc, dc, ac) is calculated;

iv) the value QCimage(x, z)=QCimage(x, y)+w is calculated;

v) loops are performed for the points and the intervals so as to fill the correspondence table QCimage and vi) said table QCimage is used for establishing correspondence between zones.

In the second embodiment (backward projection), the point corresponding to a trace T at source-sensor travel time tsc of the data is put into correspondence with the corresponding zone in the migrated image if the value QCimage (T, tsc) in the correspondence table is greater than a given threshold, e.g. zero. Advantageously, the zone pointed to in the migrated image is a set of intervals Zi characterized by the position of the trace xz, and the start and finish zd and zf of the corresponding interval. For each trace T of input data, for each interval Zi, and for each point (x, z) of the interval Zi, the following steps are performed:

i) for the ray from the source S relating to the trace T at the point (x, z), the following parameters are read from the parameter table: travel time ts, path length ls, and orientation of the ray at its ends ds and as;

ii) for the ray to the sensor C relating to the trace T at the point (x, z), the following parameters are read from the parameter table: travel time tc, path length lc, and orientation of the ray at its ends dc and ac;

iii) the source-to-sensor travel time tsc=tc+ts is calculated;

iv) the weighting factor w (ls, ds, as, ls, dc, ac) is calculated;

v) the value of QCimage(T, tsc)=QCimage(T, tsc)+w is calculated;

vi) looping is performed for the points, the intervals,and the traces to fill the correspondence table QCimage; and vii) said table is used to establishes correspondence between zones.

Advantageously, in said method a parameter whose value is proportional to the value of QCimage is assigned to the corresponding zones in the two spaces. By way of example, this parameter can be a semitransparent color, and its value can be the density of the color.

The method of the invention is usable in numerous fields,in particular in well seismic surveying, and also in "pre-stack" surface seismic surveying, with the traces coming from various sources and sensors not being added to one another in this case, thus making it possible to one another in this case, thus making it possible to apply the GRT migration method.

BRIEF DESCRIPTION OF THE DRAWINGS

FIGS. 12 and 14 are flow charts showing how the method of the invention operates respectively for forward projection and for backward projection.

DESCRIPTION OF THE PREFERRED EMBODIMENT

The present invention relates to a method of controlling the quality of GRT migration of seismic data, e.g. from a well survey, making it possible to go between seismic data space and migrated image space.

During GRT migration, the table of parameters obtained by ray tracing is saved in a -file. These intermediate results for a ray going from a point of the image to a source or to a sensor are constituted by its path length. its travel time, and the angles of incidence at the beginning and at the end of the path. The table can thus be used during the steps of the method of the invention.

Figure 10:
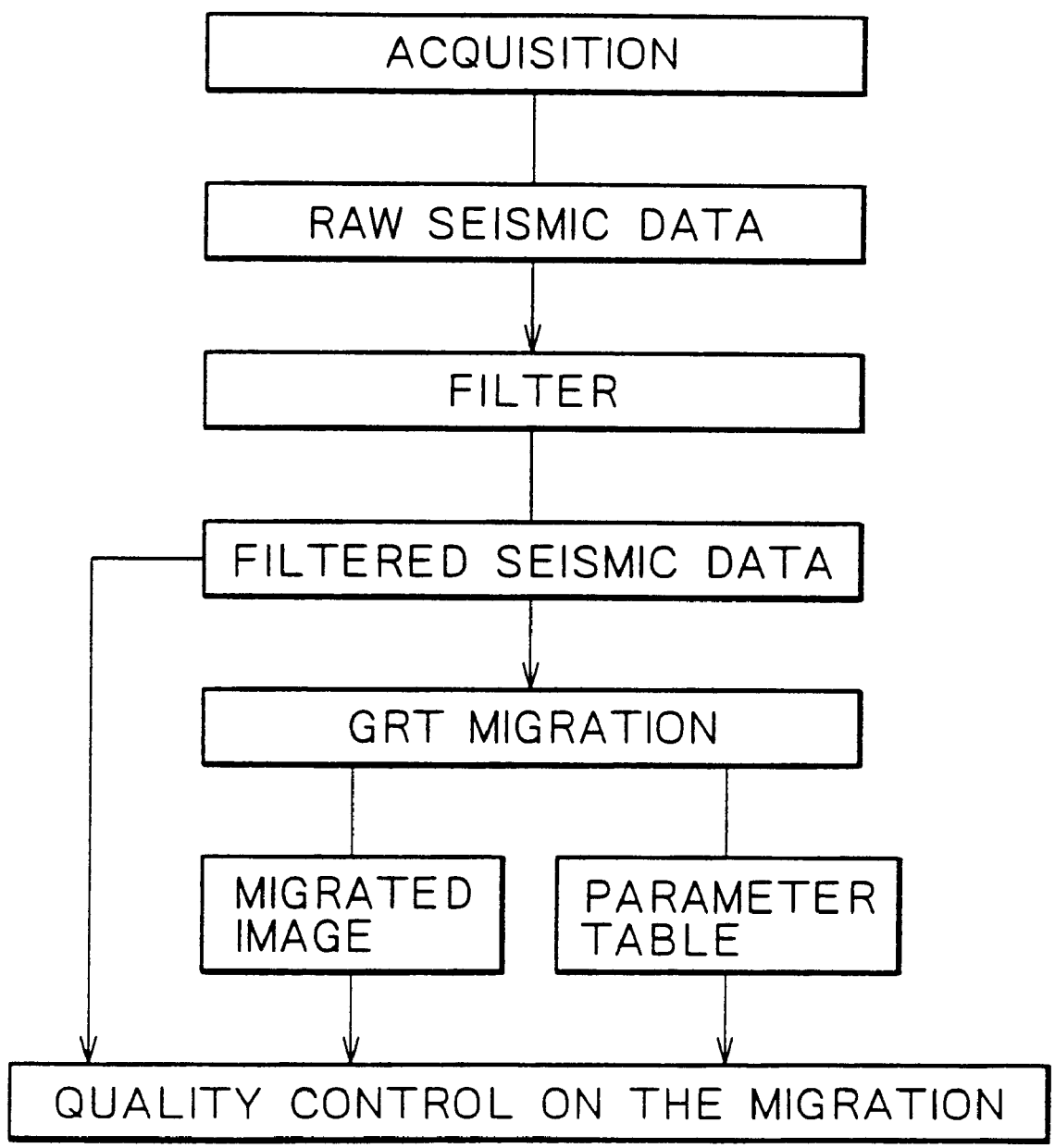
FIG. 10 shows flow of data in the method of the invention.

Thus, as shown in FIG. 10. on output from the sensors (acquisition) raw seismic data is obtained which, after filtering, is subjected to the GRT migration method, and the method of the invention using the filtered seismic data, the migrated image, and the parameter table.

Figure 11:
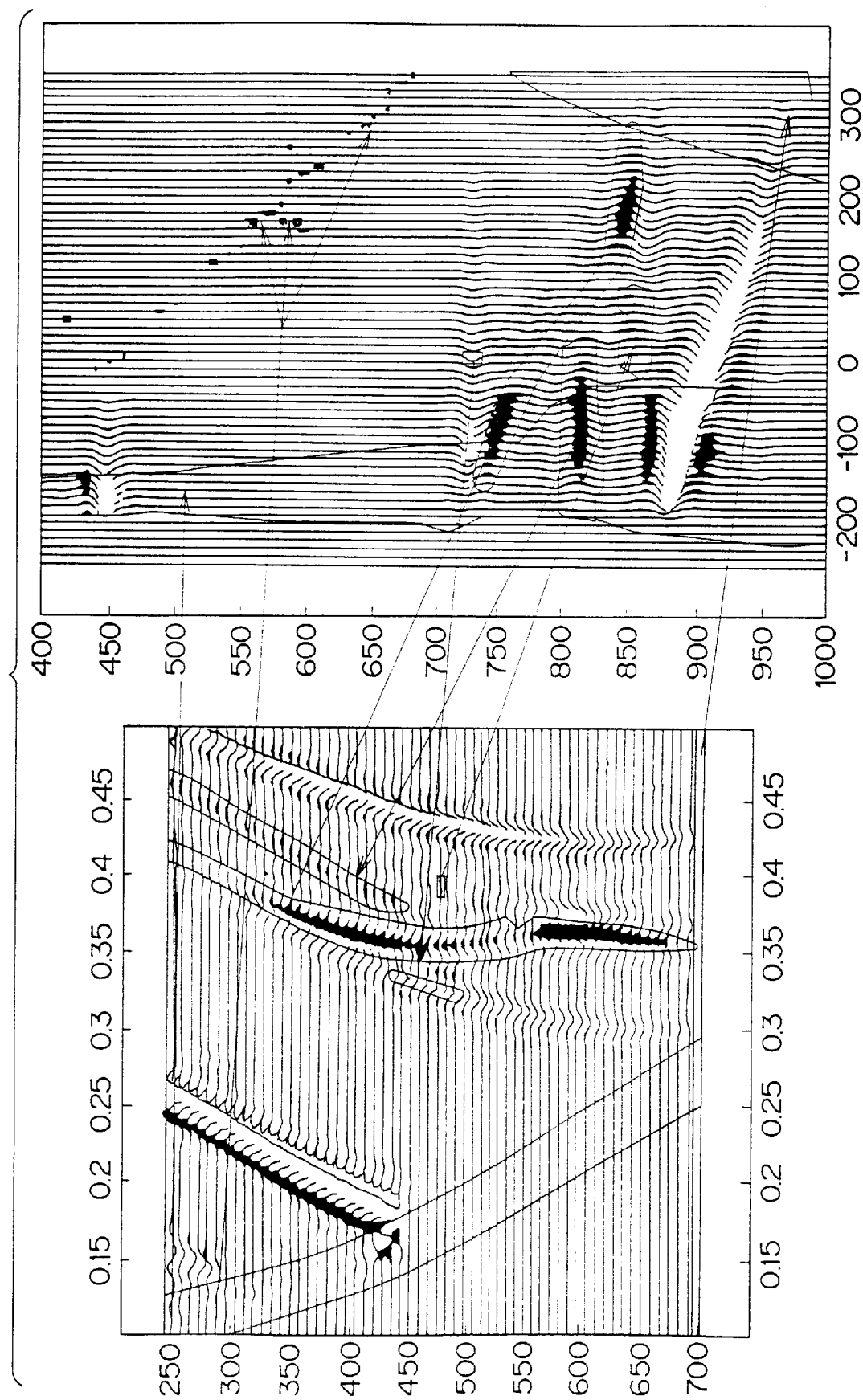
FIG. 11 shows the corresponding zones in data space and in image space in the method of the invention.

In the method of the invention, correspondence is established between at least one zone of one of the two spaces, i.e. seismic data space and migrated image space, and at least one zone in the other space. As shown in FIG. 11, it is thus possible to visualize corresponding zones in data space and in migrated image space, said zones being pointed to interactively, either in data space or in migrated image space.

Projecting a zone from data space into migrated image space is referred to as "forward projection". Inversely, projecting a zone from migrated image space into data space is referred to as "backward projection".

Figure 12:
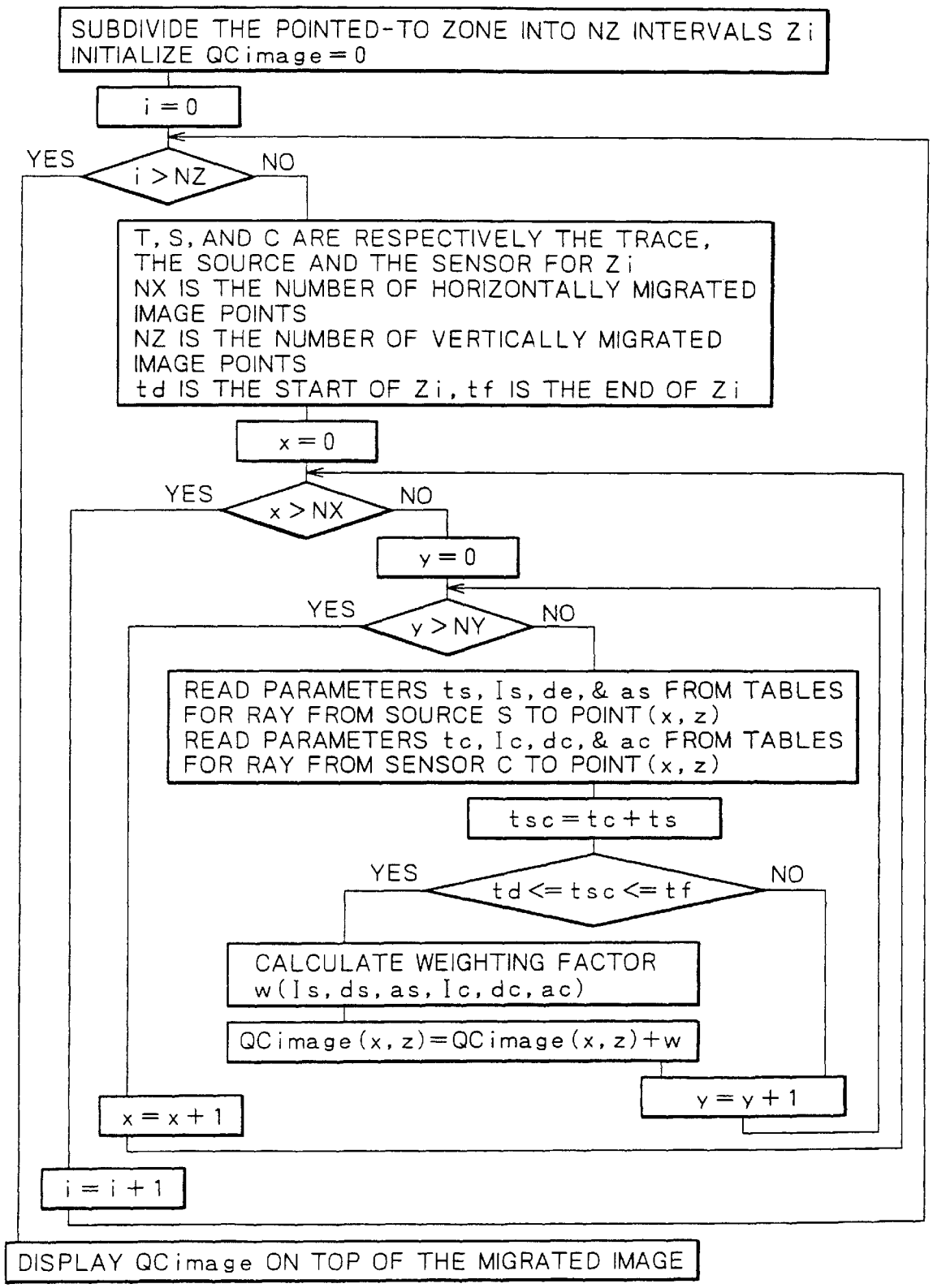

In the first implementation (forward projection) the various steps of the quality control method of the invention are illustrated by the flow chart of FIG. 12.

Figure 1:
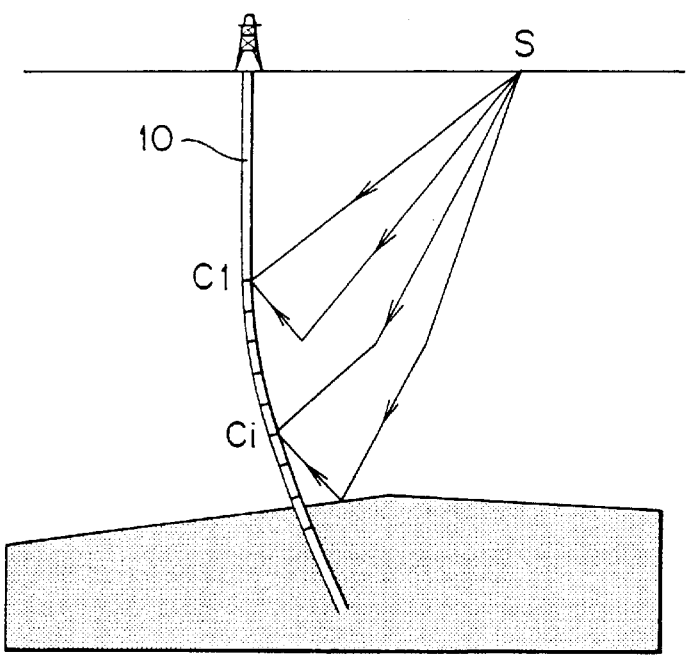
FIG. 1 shows well seismic surveying.
Figure 2A:
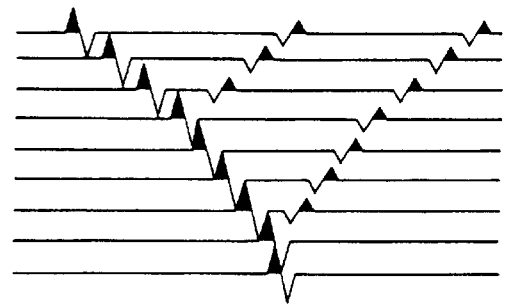
FIGS. 2A and 2B show data prior migration, before and after filtering.
Figure 2B:
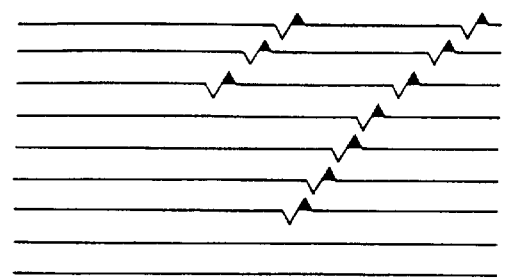
Figure 3:
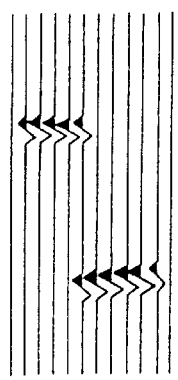
FIG. 3 shows the migrated image.
Figure 4:
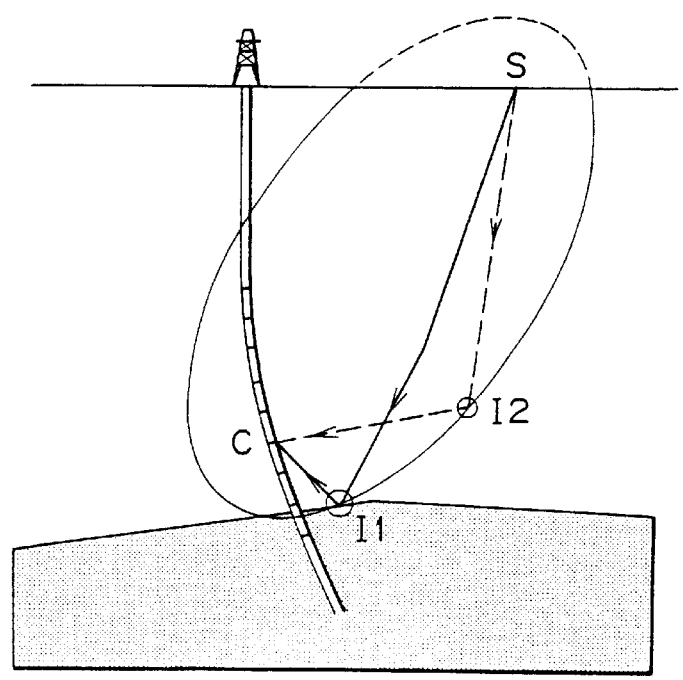
FIGS. 4 and 5 show how the migrated image is built up point by point, together with the corresponding travel time curves.
Figure 5:
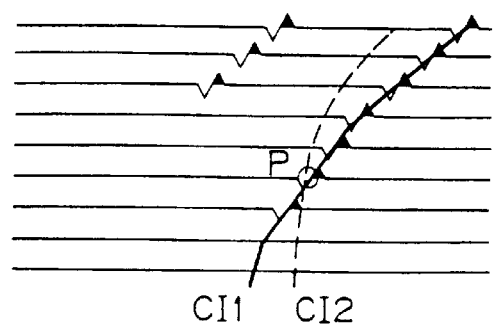
Figure 6:
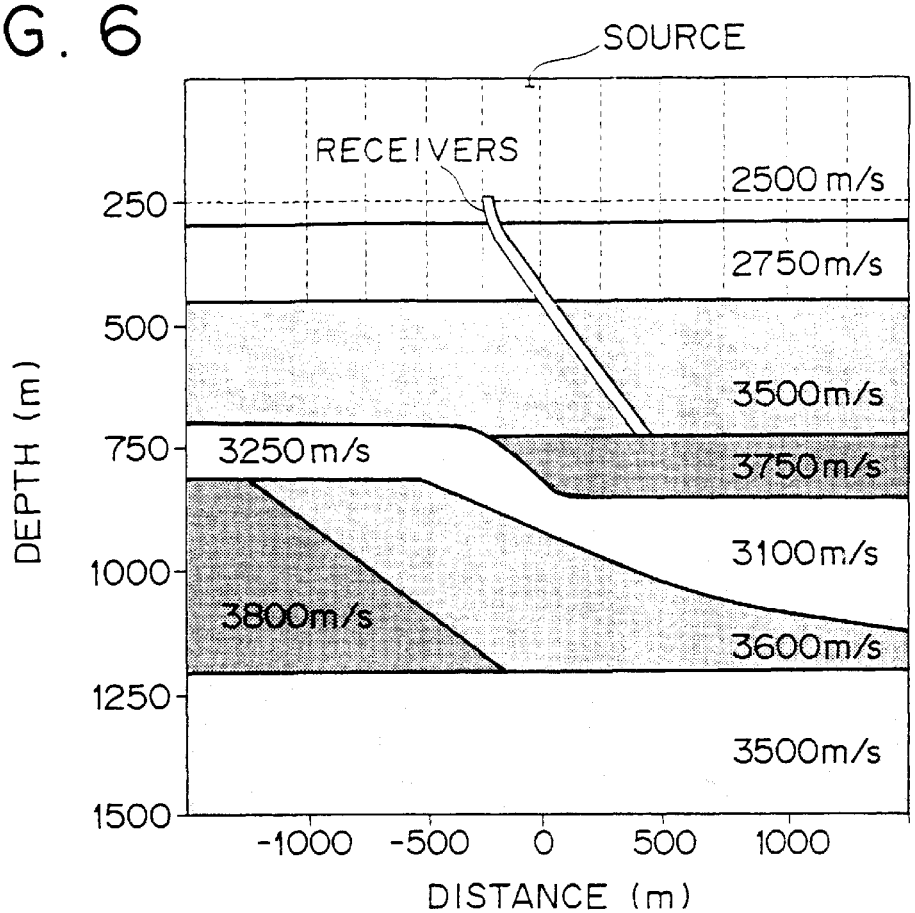
FIG. 6 shows an example of a speed model.
Figure 7:
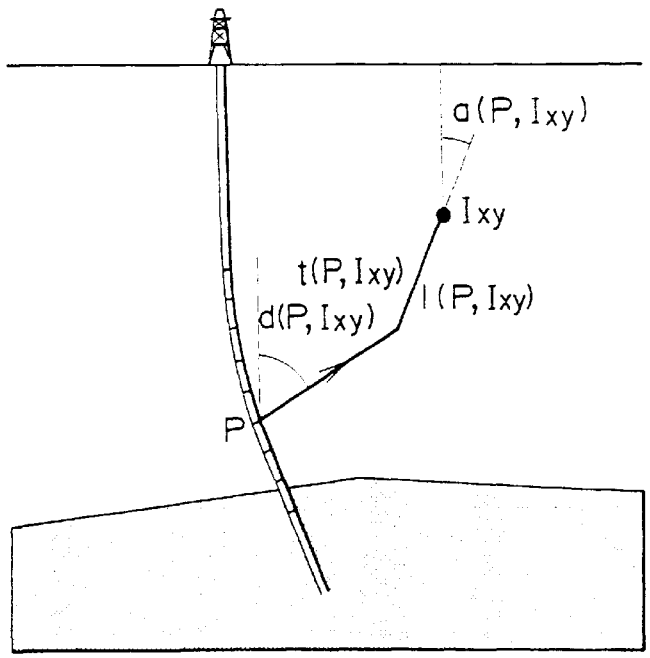
FIG. 7 shows a variant of the traditional GRT migration algorithm.
Figure 8:
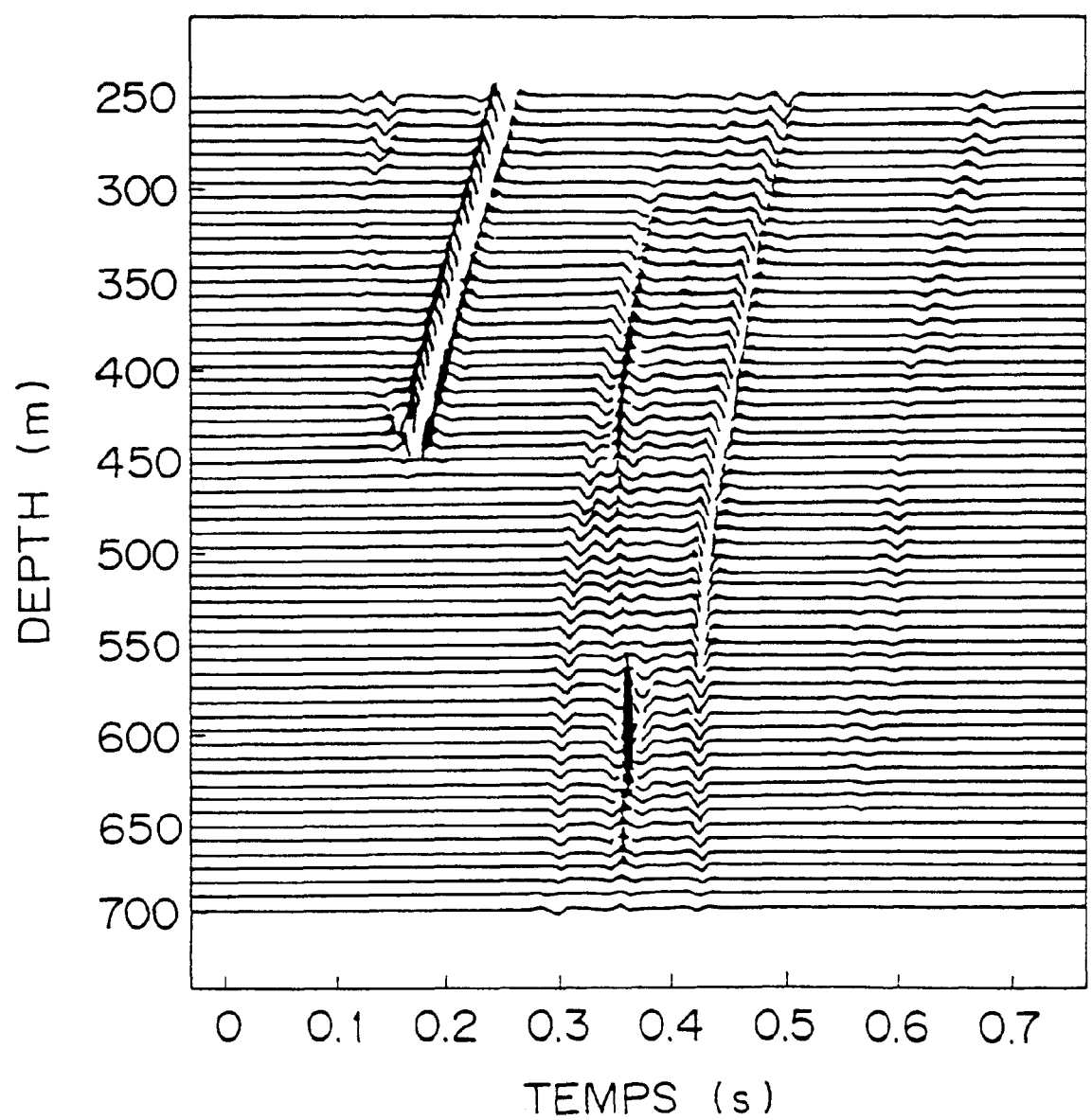
FIG. 8 shows an example of seismic data as obtained after filtering.
Figure 9:
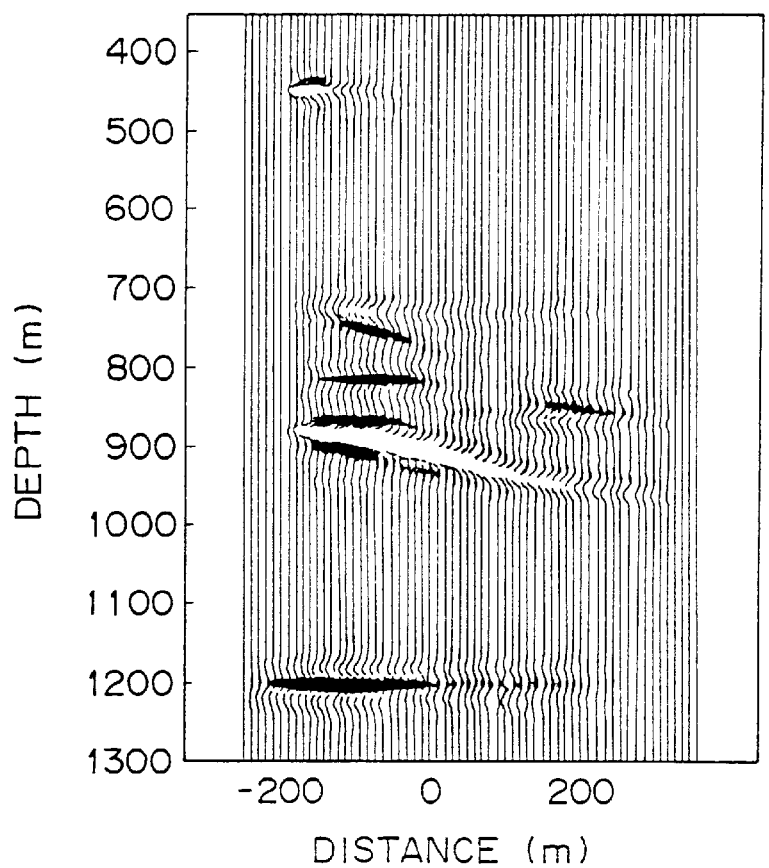
FIG. 9 shows a migrated image obtained by GRT migration of the data shown in FIG. 8.
Figure 13:
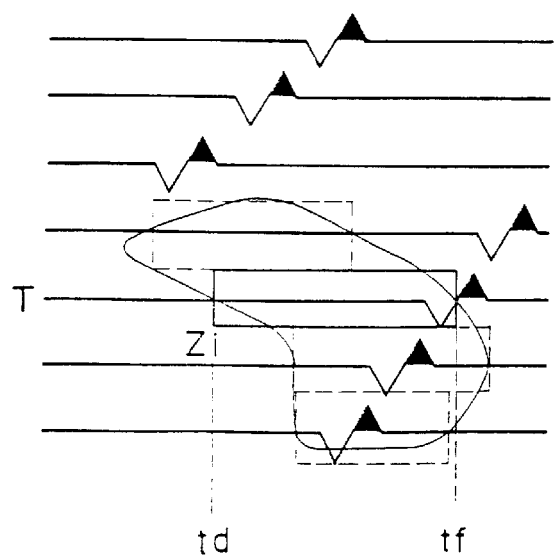
FIG. 13 shows how the method of the invention operates with forward projection.

The zone pointed to is initially subdivided into NZ intervals Zi characterized by a trace T, a start of interval td, and an end of interval tf, as illustrated in FIG. 13. For each interval Zi and for each point (x, z) of the migrated image, the following steps are performed:

i) the parameters in the parameter table are read for the ray from the source S, relating to said interval Zi at the point (x, z), namely: travel time ts, path length ii) parameters are read from the parameter table for the ray of the sensors C, relating to said interval Zi at ls, and orientation of the ray at its ends as and ds;

iii) parameters are read from the parameter table for the ray of the sensors C, relating to said interval Zi at the point (x, z), namely: travel time tc, path length lc, and the orientation of the ray at its ends ac and dc;

iv) the source-to-sensor travel time is calculated: tsc=tc+ts;

v) if the time tsc lies within the above-defined interval Zi, i.e.: td≦tsc≦tf, then the weighting factor w is calculated as a function of the parameters ls, ds, as, lc, dc, and ac, as is the value at said point in a table QCimage: QCimage (x, z)=QCimage (x, z)+w; and vi) thereafter, the table QCimage is used to point to the migrated image. The point (x, z) of the migrated image is put into correspondence with the zone pointed to in data space providing the value of QCimage(x, z) is greater than a given threshold, e.g. 0.

It is then possible to give corresponding zones the same parameter whose value is proportional to the value of QCimage (x, z).

In the second implementation (backward projection) of the quality control method of the invention, the various steps are shown by the flow chart of FIG. 14.

The zone pointed to in the migrated image is initially subdivided to NZ intervals Zi characterized by a trace (x, z), a start of interval zd and an end of interval zf.

For each input data trace T, for each interval Zi, and for each point (x, z) of the interval Zi in the migrated image, the following steps are performed;

i) the parameters in the parameter table are read for the ray from the source S, relating to said trace T at the point (x, z), namely: travel time ts, path length ls, and orientation of the ray at its ends as and ds;

ii) parameters are read from the parameter table for the ray of the sensors C, relating to said trace T at the point (x, z), namely: travel time tc, path length lc, and the orientation of the ray at its ends ac and dc;

iii) the source-to-sensor travel time is calculated: tsc=tc+ts;

iv) the weighting factor w is calculated as a function of the parameters ls, ds, as, lc, dc, and ac, as is the value of an image table QCimage for the point QCimage(T,tsc)= QCimage(T,tsc>+w; and v) looping is performed over the points, the intervals Zi, and the traces T in order to fill said table QCimage.

Thereafter, the table QCimage is used to point to the input data. The point corresponding to trace T at time tsc of the data is put into correspondence with the zone pointed to in the migrated image if the value of QCimage (T,tsc) is greater than a given threshold, e.g. 0.

A parameter can then be given to the zones in correspondence, with the value of the parameter being proportional to the value of QCimage(T,tsc).

In both implementations, the method of the invention thus makes it possible to identify reflectors and to verify the quality of the migration and the input data tc the migration.

In an advantageous implementation. corresponding zones in data space and in migrated image space can be represented by areas of semitransparent colors superposed on the migrated image and on the seismic data prior to migration. After the tables have been calculated by ray tracing and after migration the user points interactively to zones, either in the input data (forward projection) or in the migrated image (backward projection), with the zone pointed to then being colored using a color defined by the user. Under such circumstances, it is advantageous to color the migrated image (in forward projection) or the data (in backward 20 projection) with a value whose density is proportional tc the value of QCimage.

What is claimed is:

1. A method of processing seismic data comprising the steps of:
   a) filtering seismic data to generate a seismic data space;
   b) migrating the seismic data space using a point-by-point migration method to create a migrated data image;
   c) building a parameter table comprising parameters for at least one wave in the seismic data;
   d) using the parameter table to establish a correspondence between at least one zone in the seismic data space and at least one zone in the migrated image space; and
   e) using the correspondence to verify the quality of the migration.

2. The method of claim 1 wherein the point-by-point migration method is a generalized Radon transform.

3. The method of claim 1, wherein ray tracing is used to build the parameter table.

4. The method of claim 3, wherein the parameter table comprises, for at least one wave, parameters comprising a ray path length; a travel time; an angle of incidence at one of two ends of the ray path; and an angle of incidence at the other of two ends of the ray path.

5. The method of claim 1, wherein establishing correspondence comprises using a correspondence table.

6. The method of claim 1, further comprising the step of using the correspondence in interactively pointing to zones.

7. A method of processing seismic data comprising the steps of:

a) generating two spaces, wherein the first of the two spaces is generated by filtering the seismic data and the second of the two spaces is created by migrating the first space using a generalized Radon transform;

b) pointing to a zone in one of the two spaces;

c) projecting the pointed-to zone into the other of the two spaces;

d) building a parameter table using ray tracing;

e) using the parameter table to establish a correspondence between the pointed-to zone in the one of the two spaces and the projected pointed-to zone in the other of the two spaces; and f) using the correspondence to verify the quality of the migration.

8. The method of claim 7, wherein the step of projecting comprises forward-projecting a zone in the first of the two spaces into the second of the two spaces.

9. The method of claim 7, the step of projecting comprises backward-projecting a zone in the second of the two spaces into the first of the two spaces.

10. The method of claim 7, wherein establishing a correspondence comprises building a correspondence table QCimage.

11. The method of claim 10, wherein establishing correspondence comprises putting a point (x,z) in one of the two spaces into correspondence with the zone pointed-to in the other of the two spaces if a value QCimage(x,z) in the correspondence table QCimage is greater than a given threshold.

12. The method of claim 7, further comprising the step of using the correspondence of points to verify the quality of the seismic data space.

13. A method of processing seismic data comprising the steps of:

a) generating two spaces, wherein the first of two spaces is generated by filtering the seismic data and the second of the two spaces is created by migrating the first space using a generalized Radon transform;

b) pointing to a zone in one of the two spaces;

c) projecting the pointed-to zone into the other of the two spaces; wherein the pointed-to zone comprises a set (NZ) of intervals (Zi), each interval comprising a trace (T), a start of interval (td), and an end of interval (tf);

d) building a parameter table using ray tracing for each trace (T) extending from a source (S) to a sensor (C);

e) using the parameter table to establish a correspondence between the pointed-to zone in the one of the two spaces and the projected point-to- zone in the other of the two spaces, wherein the parameter table is used to build a correspondence table QCimage; and f) using the correspondence to verify the quality of the migration.

14. The method of claim 11, wherein the step of building the parameter table further comprises, for each trace (T) in each interval Zi:

d1) determining, for a ray path from source (S) to a point (x,z), parameters comprising a travel time (ts), a path length (ls), an angle of incidence (ds) at one end of the ray path and an angle of incidence (as) at the other end the ray path; and d2) determining, for a ray path to sensor (C) from the point (x,z), parameters comprising a travel time (tc), path length (lc), an angle of incidence (dc) at one of two ends of the ray path and an angle of incidence (ac) at the other of two ends of the ray path.

15. The method of claim 14, wherein the seismic data space is forward-projected into the migrated space, and establishing a correspondence further comprises filling the correspondence table QCimage by:

e1) calculating the source-to-sensor travel time tsc, wherein tsc=tc+ts;

e2) if $td \leq tsc \leq tf$, calculating weighting factor w(ls, ds, as, lc, dc, ac);

e3) calculating QCimage(x,z)=QCimage(x,z)+w; and e4) repeating steps e1 through e3 for all intervals Z.

16. The method of claim 14, wherein the migrated space is back-projected into the seismic data space, and establishing a correspondence further comprises filling the correspondence table QCimage by:

e1) calculating the source-to-sensor travel time tsc, wherein tsc=tc+ts;

e2) if $td \leq tsc \leq tf$, calculating weighting factor w(ls, ds, as, lc, dc, ac);

e3) calculating QCimage(T,tsc)=QCimage(T,tsc)+w; and e4) repeating steps e1 through e3 for all intervals Z.

17. The method of claim 15, further comprising the step of assigning a parameter to zones in correspondence, wherein the parameter is represented by a color, the density of the color proportional to the value of QCimage(x,z).

18. The method of claim 16, further comprising the step of assigning a parameter to zones in correspondence, wherein the parameter is represented by a color, the density of the color proportional to the value of QCimage(T,tsc).

19. The method of claim 13 further comprising the step of using the correspondence to verify the quality of the seismic data space.

20. The method of claim 13, further comprising the step of using the correspondence in interactively pointing to zones.

* * * * *